US007379456B2

(12) United States Patent
Muranaka et al.

(10) Patent No.: US 7,379,456 B2
(45) Date of Patent: May 27, 2008

(54) NETWORK ROUTING APPARATUS

(75) Inventors: Takayuki Muranaka, Sagamihara (JP);
Takeshi Furusawa, Yokohama (JP);
Tetsuya Nagata, Hadano (JP);
Nobuhito Matsuyama, Hadano (JP);
Tatsuo Kanetake, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 809 days.

(21) Appl. No.: 10/782,530

(22) Filed: Feb. 18, 2004

(65) Prior Publication Data

US 2004/0233920 A1    Nov. 25, 2004

(30) Foreign Application Priority Data

Feb. 25, 2003    (JP)    ............................. 2003-046679

(51) Int. Cl.
*H04L 12/28*    (2006.01)

(52) U.S. Cl. ........................ 370/389; 370/470; 370/474

(58) Field of Classification Search ..................... None
See application file for complete search history.

(56) References Cited

U.S. PATENT DOCUMENTS 4,614,945 A * 9/1986 Brunius et al. ........ 340/870.03
5,787,070 A * 7/1998 Gupta et al. ................. 370/217
6,480,488 B1 * 11/2002 Huang ......................... 370/389
2002/0027917 A1    3/2002 Sugai et al.

FOREIGN PATENT DOCUMENTS

JP    2001-211203    8/2001

OTHER PUBLICATIONS

"Routing principle and technology," National Defense Industrial Publishing (P.R. China), pp. 58-67, figures 2.6.3-2.6.5 (Jan. 2003).

* cited by examiner

*Primary Examiner*—Robert W. Wilson
(74) *Attorney, Agent, or Firm*—Townsend and Townsend and Crew LLP

(57) ABSTRACT

Each routing unit of the network routing apparatus includes: one or a plurality of transfer means each for extracting a packet header of a packet received from a line, and one or a plurality of search means each for extracting output destination information using the packet header received from each transfer means; wherein, in each routing unit, one search means is connected to one transfer means, or a plurality of transfer means are connected to one search means, or a plurality of search means are connected to one transfer means, or a plurality of search means and a plurality of transfer means are connected to one another.

18 Claims, 10 Drawing Sheets

FIG.7
| Routing table | | | |
|---|---|---|---|
| Search key | Search results | | |
| Destination IP address | Output switching engine No. | Output transfer engine No. | Output line No. |
| 192.168.0.0 | 0 | 1 | 2 |
| 192.168.0.1 | 2 | 3 | 4 |
| | | | |
FIG.8
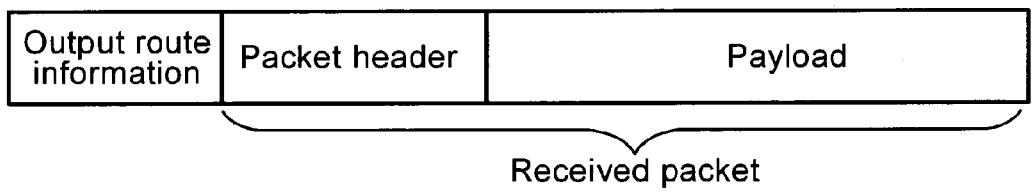
FIG.11
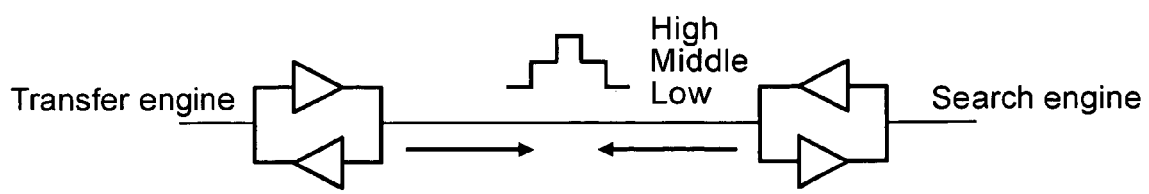

NETWORK ROUTING APPARATUS

BACKGROUND OF THE INVENTION

The present invention relates to a high-speed and high-port-density network routing apparatus and, more particularly, to a network routing apparatus in which the combination rate between connectible search engines and transfer engines can be changed to hereby achieve single-to-multiple, multiple-to-single, and multiple-to-multiple configurations.

In a network system, a plurality of networks are connected via a network routing apparatus such as a router, and packets are routed in the network routing apparatus. The network routing apparatus, after receiving a packet, determines the forwarding destination of the received packet from the destination address included in this packet, and then outputs the packet to the line to which the router or host or client terminal of the forwarding destination is connected.

An example of such a network routing apparatus is disclosed in, for instance, U.S. Patent Application Publication No. 20020027917 (Japanese Patent Laid-open No. 2001-211203). The network routing apparatus described in this Japanese Patent laid-open No. 2001-211203 comprises network interface boards (NIFS) that are each connected to various types of network interfaces (lines) to send and receive packets, routing processors (RPs) that search for the appropriate packet forwarding destination from the destination address included in the header of a received packet and then forward the packet, and a crossbar switch (CSW) that is connected to each RP to forward packets between RPs. In this conventional network routing apparatus, each RP further includes a plurality of packet forwarding units, each of which searches for the appropriate packet forwarding destination from the destination address included in the header of a received packet and then forwards the packet. In each RP, the received packet from an NIF and the received packet from the CSW are distributed to the above-mentioned plurality of packet forwarding units. Thus, the packet forwarding process in the network routing apparatus is speeded up.

SUMMARY OF THE INVENTION

FIG. 12 is a view showing an example of a network routing apparatus configuration. In FIG. 12, this network routing apparatus comprises a routing processor that includes, for example, at least one transfer engine with a packet buffer, at least one search engine with a routing table, and at least one switching engine. The network routing apparatus also has a crossbar switch that is connected to a plurality of routing processors to route packets therebetween. The search engines and transfer engines in each routing processor are connected at the rate of 1:1 in terms of quantity. The transfer engines, search engines, and switching engines in FIG. 12 correspond to the packet forwarding units shown in the bibliography earlier mentioned herein.

First, in step 1, after receiving a packet from a line, a transfer engine stores the received packet into a packet buffer. Also, in step 2, the transfer engine extracts packet header information from the received packet and transmits the header to a search engine. In step 3, the search engine searches for a routing table on the basis of the received packet header and determines an output route. The routing table is stored within, for example, an internal memory of the search engine or a memory external thereto, and contains the output switching engine and output line information corresponding to the destination IP address. In step 4, the search engine transmits the determined output route to the transfer engine. The search engine may also perform either a filtering process that discards the packet, or a process relating to QoS (Quality of Service), on the basis of the packet header. In step 5, the transfer engine transmits the received output route information and the packet stored within the packet buffer, to the switching engine. In step 6, the switching engine switches the packet to the above-determined output route.

For example, in such network routing apparatus as shown in FIG. 12, transfer engines and search engines are fixedly connected at the rate of 1:1 in terms of quantity. The search engines in the network routing apparatus retain important information relating to networks. A user of the network routing apparatus, therefore, may wish to duplex a search engine in order to improve reliability. In the above-described network routing apparatus, however, if the search engine is duplexed, the corresponding transfer engine in the 1:1 connection configuration also needs to be duplexed and, in addition, the line to which the transfer engine is connected requires duplexing. Consequently, duplexing cannot be implemented just by changing the configuration of the network routing apparatus.

In addition, if the number of transfer engines in the above-described network routing apparatus is increased for an increased number of ports, the number of search engines connected at 1:1 also needs to be increased. In general, search engines are expensive, and so an increase in the number thereof also results in the entire apparatus being correspondingly expensive.

Furthermore, to manufacture a network routing apparatus having transfer engines and search engines connected in a single-to-multiple or multiple-to-single combination, greater development costs are required since the appropriate LSIs for the transfer engines and search engines need to be developed according to the particular connection situation between these engines.

The present invention, in view of the foregoing, provides a network routing apparatus having transfer engines and search engines connectable into a single-to-multiple, multiple-to-single, or multiple-to-multiple configuration.

The present invention also provides a network routing apparatus capable of selecting a plurality of connection patterns for a transfer engine and search engine of the same structure.

In addition, the present invention provides a network routing apparatus capable of exchanging packet headers and output route information efficiently between a transfer engine and a search engine.

A network routing apparatus according to the present invention comprises a plurality of routing units each receiving a packet from a line and routing the packet, and a switching unit transferring a packet from each routing unit to other routing units.

Each routing unit further has one or a plurality of transfer means each extracting a packet header from the packet received from each line, and one or a plurality of search means each extracting output destination information using the packet header received from each transfer means.

And in each routing unit, one search means is connected to one transfer means, or a plurality of transfer means are connected to one search means, or a plurality of search means are connected to one transfer means, or a plurality of transfer means and a plurality of search means are connected to one another.

Each transfer means outputs a packet header to the connected respective search means.

Each search means transmits output destination information only to the transfer means to which the packet header has been output.

BRIEF DESCRIPTION OF THE DRAWINGS

FIG. 7 shows the format of a routing table used by the search engine.

FIG. 8 shows the format of a packet to which output route information is assigned.

FIG. 11 shows a conceptual diagram of a simultaneous bi-directional transfer logic (SBTL) interface.

DETAILED DESCRIPTION OF THE EMBODIMENTS

Embodiments of this network routing apparatus are described below using the accompanying drawings.

Figure 1:
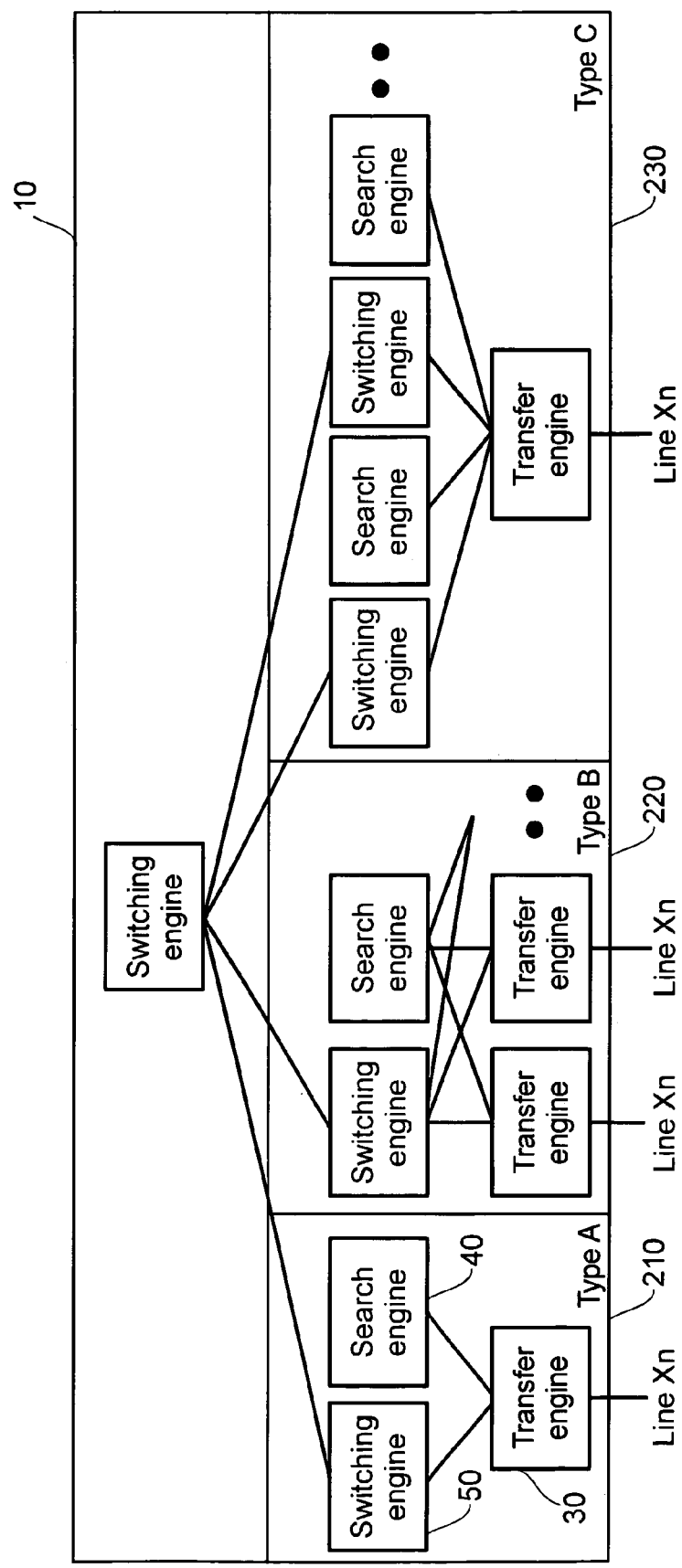
FIG. 1 shows a configuration example of a network routing apparatus pertaining to the present invention.

FIG. 1 shows a configuration example of a network routing apparatus pertaining to the present invention.

In FIG. 1, the network routing apparatus comprises a switch 10 constructed of, for example, a crossbar switch, and a plurality of routing processors 210, 220, and 230, each of the routing processors being connected to the switch 10. Each routing processor has a transfer engine 30, a search engine 40, and a switching engine 50. Also, the transfer engine is connected directly or indirectly to one or a plurality of lines. In FIG. 1, the network routing apparatus has as its routing processors, for example, a routing processor 210 of type A with one transfer engine 30 and one search engine 40 connected in a single-to-single combination, a routing processor 220 of type B with two or more transfer engines 30 and one search engine 40 connected in a multiple-to-single configuration, and a routing processor 230 of type C with one transfer engine 30 and two or more search engines 40 connected in a single-to-multiple combination.

Figure 2:
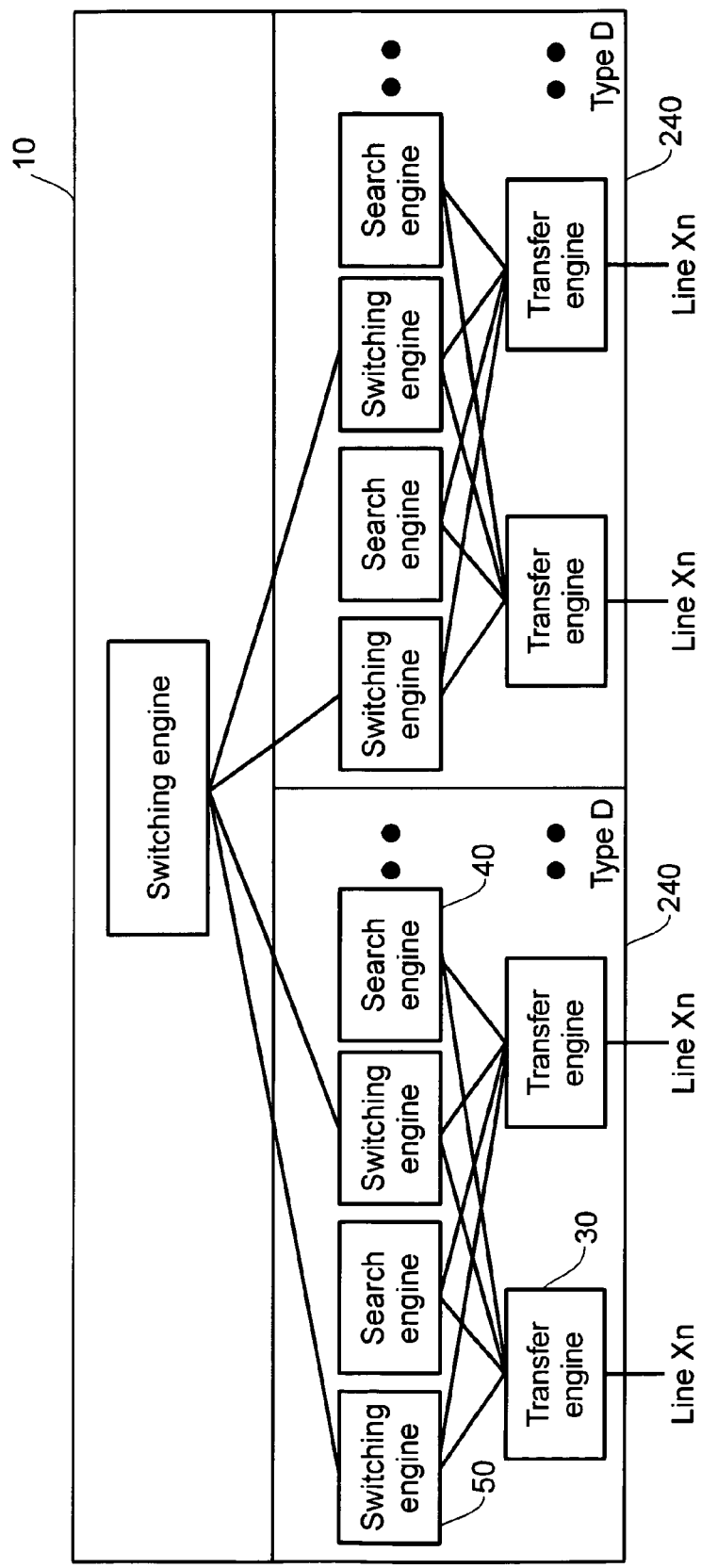
FIG. 2 shows another example of the network routing apparatus.

Another configuration example of the network routing apparatus is shown in FIG. 2.

The network routing apparatus configuration shown in FIG. 2 also has almost the same configuration as that of FIG. 1. The difference from the network routing apparatus configuration shown in FIG. 1 is that a routing processor 240 of type D with two or more transfer engines and two or more search engines connected in a multiple-to-multiple combination is provided as an additional routing processor.

In each routing processor, there is provided an architecture for single-to-multiple, multiple-to-single, or multiple-to-multiple interconnection between transfer engines 30 and search engines 40. Each transfer engine 30 has a connection means for connecting a plurality of search engines 40 in accordance with the required setup information corresponding to the architecture. Similarly, each search engine 40 has a connection means for connecting a plurality of transfer engines 30 in accordance with the required setup information corresponding to the architecture.

In FIG. 1, three routing processors (one, type A; one, type B; and one, type C) are shown. In FIG. 2, two routing processors 240 of type D are shown. However, the network routing apparatus can have a routing processor of any one of types A to D, or can have one or a plurality of routing processors of each of types A to D.

The switch 10 has a switching engine to transfer packets between routing processors. The switch 10, after receiving a packet and output route information from a switching engine 50 of each routing processor, transfers the packet to the switching engine 50 associated with an output switching engine number contained in the output route information. The switch 10 may be of a multiplexed configuration with an acting switch and a standby switch. Also, the switching engine of the switch 10 and the switching engines 50 in each routing processor can have the same structure.

Each transfer engine 30 has a packet buffer for storing packets thereinto, and stores into the packet buffer the packet received from a line. Also, the transfer engine 30 extracts a packet header from the received packet and then sends the packet to a search engine 40. The transfer engine 30 receives output route information from the search engine 40 and transfers the received output route information and the packet stored within the packet buffer to the corresponding switching engine 50. Also, the transfer engine 30 may further transfer an input line number and an input transfer engine number to the search engine 40. The input line number and the input transfer engine number are used for the search engine 40 to perform, for example, filtering or QoS-related processing.

Each search engine 40 has an internal memory or is connected to an external memory. The internal memory or the external memory has a stored routing table. In this routing table are registered one or more addresses (IP addresses) and output route information which contains the output switching engine number, output transfer engine number, and output line number corresponding to each address. The search engine 40 searches the routing table by use of, as its search key, the destination address contained in the packet header received from a transfer engine 30. After extracting the output route information associated with the address which matches the destination address, the search engine 40 sends the extracted information to the transfer engine 30. Also, the search engine 40 performs filtering or QoS-related processing, on the basis of the input line number and input transfer engine number received from the transfer engine 30 and/or on the basis of the above-extracted output route information.

The switching engine 50 receives a packet and output route information from the transfer engine 30, and in accordance with the output route information, transfers the packet to the switching engine of the switch 10 or to the transfer engine 30. The switching engine 50 also receives output route information and a packet from the switch 10 and transmits both to the transfer engine 30. The transfer engine 30, after receiving the packet and the output route information from the switching engine 50, outputs the packet to a line in accordance with the output route information.

As described above, in the routing processor 210 of type A, one engine 40 and one transfer engine 30 are connected. The routing processor 210 of type A is of a configuration with importance attached to a performance balance, compared with the configuration of type B, C, or D.

The routing processor 220 of type B has a configuration with two or more transfer engines 30 connected for one search engine 40. Although, in the routing processor 220 of type B shown in FIG. 1, two or more transfer engines are also connected for one switching engine 50, switching engines 50 and transfer engines 30 may be connected at the same rate, i.e., 1:1, by arranging a plurality of switching engines 50. In the above-mentioned configuration of type A, to increase the number of lines (ports) for one search engine 40, there is a need to correspondingly add transfer engines 30, search engines 40, and switching engines 50 each. In the configuration of type B, however, the unit price per port can be reduced since the number of lines (ports connected to each line) for one search engine 40 can be increased. That is to say, the routing processor 220 of type B is of a configuration with importance attached to a line accommodation capacity (port density), compared with the configuration of type A or C. In particular, when a long packet, i.e., a packet of a large data size is handled, the load on the search engine 40 which processes only the packet header [the performance of the engine is expressed in packets per second (pps)] is small, compared with the load of the transfer engine 30 which processes the entire packet including its payload (data) [likewise, performance is expressed in bits per second (bps)]. Accordingly, the configuration of type B allows efficient use of the search engine 40.

The routing processor 230 of type C has a configuration with two or more search engines 40 connected for one transfer engine 30. Type C is of a configuration with importance placed on reliability by duplexing each switching engine 50 and search engine 40, instead of duplexing a line. Under the configuration of type C, for example, one set of search engines 40 and switching engines 50 can be used as a standby system, and the remaining engines, as the acting system. In particular, since each search engine 40 retains important information on networks, the reliability of the routing processors 230 can be improved by duplexing the search engine 40. The standby system does not always need to be constituted by one set of engines, and may be constituted by a plurality of sets. Although the switching engine 50 is also duplexed in the configuration of FIG. 1, only the search engine 40 may be duplexed for a 1:1 connection configuration of switching engines 50 and transfer engines 30.

The routing processor 240 of type D has a configuration with two or more search engines 40 connected for two or more transfer engines 30. In the routing processor 240 of type D, a plurality of transfer engines 30 are connected to each search engine 40. For this reason, a number of lines (ports) are provided for one search engine 40. Also, the search engine 40 is duplexed by connecting a plurality of search engines 40 to each transfer engine 30. That is to say, the configuration of type D is a combination of those of types B and C. Therefore, as with type C, type D allows one set of, or a plurality of sets of, search engines 40 and switching engines 50 to be constructed as a standby system. The routing processor 240 of type D may also have switching engines 50 and transfer engines 30 connected at the rate of 1:1.

By the way, each transfer engine 30, search engine 40, and switching engine 50 are constructed of one or a plurality of LSIs. Each LSI constituting the transfer engine 30, search engine 40, and switching engine 50, is mounted on a printed-circuit board or a wiring board such as a ceramic board. Each LSI is connected by a plurality of signal conductors pre-formed and pre-connected on or in a wiring board. These signal conductors are formed on or in the wiring board via metals such as copper. Each LSI constituting the transfer engine 30, search engine 40, and switching engine 50, has a plurality of input/output terminals connected to each signal conductor, through which, as described above, packets, packet headers, output route information, and the like are transferred between the three types of engines. In this manner, each routing processor is embodied by each LSI that constitutes the transfer engine 30, search engine 40, and switching engine 50, and by the wiring board on which each LSI is mounted. In addition to each LSI, the wiring board has elements such as a memory. This memory is used, for example, to store the routing table described above.

The transfer engine 30, the search engine 40, and the switching engine 50 may each be mounted on an independent wiring board, not on the same wiring board. Also, the transfer engine 30, the search engine 40, and the switching engine 50 may each be constructed as an independent module, unit, or card, and built into the network routing apparatus. When constructed as a module, unit, or card, each type of engine is equipped with an interface for connection of each (this interface corresponds to the above-mentioned plurality of input/output terminals). Each type of engine is connected to one another via a cable (or the like) connected to such an interface (the cable or the like corresponds to the above-mentioned plurality of signal conductors).

Each of the plurality of signal conductors connecting each transfer engine 30 and each search engine 40 in each routing processor includes a data bus having a width of, for example, 128 bits. This data bus is constructed of, for example, 128 signal conductors corresponding to the width. Also, each transfer engine 30 and each search engine 40 have 128 data input/output terminals (for example, pins or sockets) that are each connected to one signal conductor of the data bus. Each data input/output terminal undertakes input/output of one-bit data, and each signal conductor transmits independent one-bit signals (data). Each transfer engine 30 and each search engine 40 can therefore exchange a maximum of 128 bits of signal data with one another using the data bus.

Figure 3:
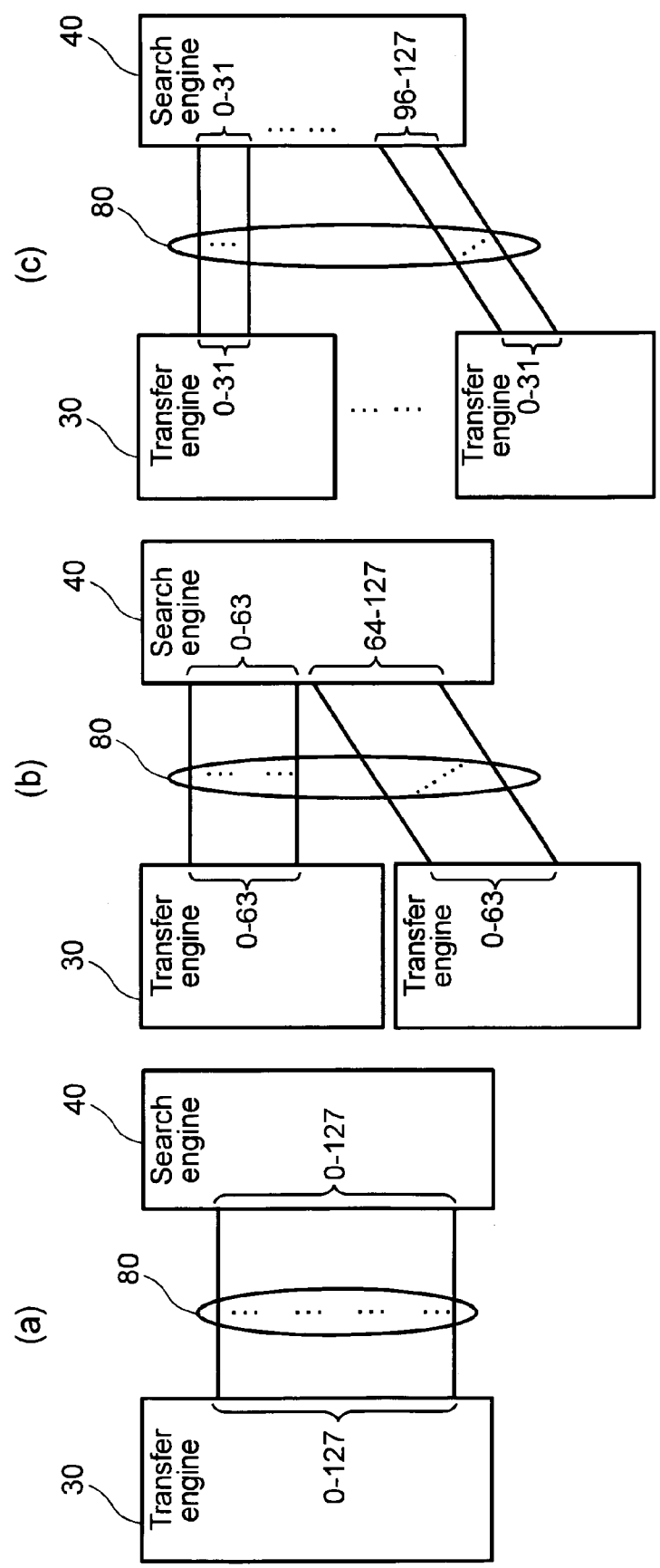
FIG. 3 shows a state under which one or more transfer engines and one search engine are connected.
Figure 4:
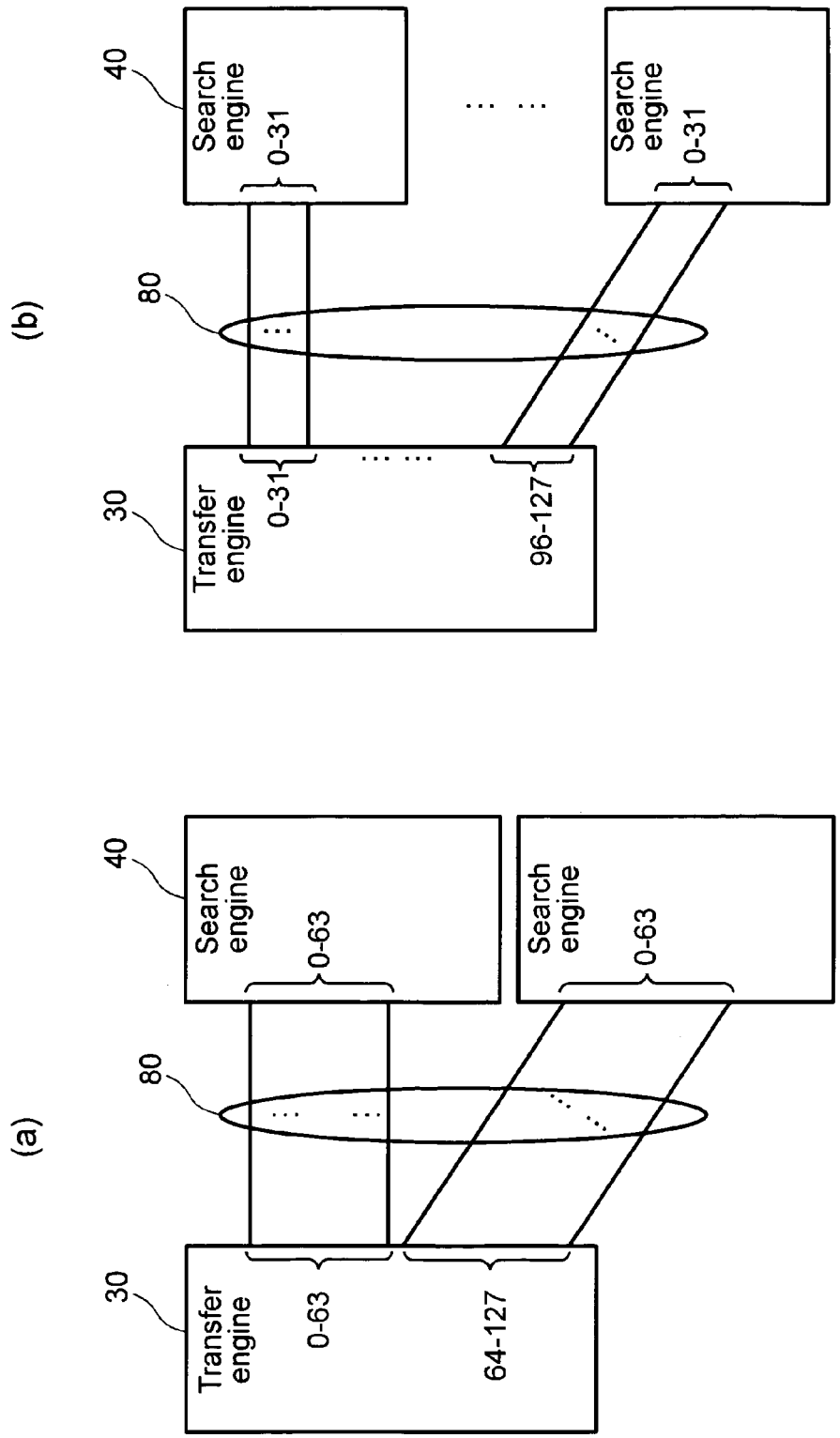
FIG. 4 shows a state under which one transfer engine and two or more search engines are connected.

FIGS. 3 and 4 show states under which each transfer engine 30 and each search engine 40 are connected via a data bus 80.

For example, in the routing processor 210 of type A, as shown in FIG. 3(*a*), one transfer engine 30 and one search engine 40 are connected via the data bus 80. In this case, the transfer engine 30 and the search engine 40 can use all respective 128 data input/output terminals (hereinafter, referred to as data input/output terminals 0-127) to exchange a maximum of 128 bits of data with each other via the 128 signal conductors (hereinafter, referred to as signal conductors 0-127) of the data bus 80.

However, in the routing processor 220 of type B, for example, if two transfer engines 30 are connected to one search engine 40, the data input/output terminals 0-127 of the search engine 40 need to be connected to the two transfer engines 30 via the data bus. Accordingly, the data input/output terminals 0-127 of the search engine 40 are logically divided into two data input/output terminal groups (data input/output terminals 0-63 and data input/output terminals 64-127). Likewise, the data input/output terminals 0-127 of each transfer engine 30 are also logically divided into two data input/output terminal groups. And as shown in FIG. 3(*b*), one data input/output terminal group (for example, data input/output terminals 0-63) in each transfer engine 30 is connected to the respective data input/output terminal groups (for example, data input/output terminals 0-63) of the search engine 40 via the data bus. In this case, therefore, the search engine 40 and each transfer engine 30 use half of the respective 128 data input/output terminals 0-127 (for example, terminals 0-63 or 64-127) to exchange a maximum of 64 bits of data via the data bus.

Also, a state under which four transfer engines 30 are connected to one search engine 40 in the routing processor 220 of type B is shown in FIG. 3(c). In this case, the data input/output terminals 0-127 of the search engine 40 are logically divided into four data input/output terminal groups (terminals 0-31, 32-63, 64-95, and 96-127). Similarly, the data input/output terminals 0-127 of each transfer engine 30 are also logically divided into four data input/output terminal groups. And as shown in FIG. 3(c), one data input/output terminal group (for example, data input/output terminals 0-31) in each transfer engine 30 is connected to the respective data input/output terminal groups of the search engine 40 via the data bus. In this case, therefore, the search engine 40 and each transfer engine 30 use ¼ of the respective data input/output terminal groups (for example, either terminals 0-31, 32-63, 64-95, or 96-127) to exchange a maximum of 32 bits of data via the data bus.

Next, a state under which two search engines 40 are connected to one transfer engine 30 in the routing processor 230 of type C is shown in FIG. 4(a). In this case, the data input/output terminals of the transfer engine 30 and of each search engine 40 are logically divided into two data input/output terminal groups. And similarly to the state shown in FIG. 3(b), one data input/output terminal group (for example, data input/output terminals 0-63) in each search engine 40 is connected to the respective data input/output terminal groups of the transfer engine 30 via the data bus.

In addition, a state under which four search engines 40 are connected to one transfer engine 30 in the routing processor 230 of type C is shown in FIG. 4(b). In this case, the data input/output terminals of the transfer engine 30 and of each search engine 40 are logically divided into four data input/output terminal groups. And similarly to the state shown in FIG. 3(c), one data input/output terminal group (for example, data input/output terminals 0-31) in each search engine 40 is connected to the respective data input/output terminal groups of the transfer engine 30 via the data bus.

Furthermore, the same also applies when two or four transfer engines 30 and two or four search engines 40 are connected in the routing processor 240 of type D. In this case, the data input/output terminals of each transfer engine 30 and of each search engine 40 are logically divided into two or four data input/output terminal groups. And one data input/output terminal group (comprising, for example, data input/output terminals 0-63 or data input/output terminals 0-31) in each search engine 40 is connected to the respective data input/output terminal groups of the transfer engine 30 via the data bus. Also, the other data input/output terminal groups in each search engine 40 are connected to the respective data input/output terminal groups of other transfer engines 30 via the data bus.

In this manner, the number of input/output terminals of each transfer engine 30 that are connected to each search engine 40 differs between type A and types B to D. Furthermore, even between types B and D, the number of input/output terminals of each transfer engine 30 that are connected to each search engine 40 differs according to the number of transfer engines 30 or search engines 40 connected. Accordingly, the maximum width of the data exchangeable between transfer engines 30 and search engines 40 differs and the data bus used for data transmission also differs in width. Furthermore, in the routing processors 230 and 240 of types C and D, respectively, each transfer engine 30 needs to output the same data to each duplexed search engine 40.

For these reasons, the transfer engines 30 and search engines 40 shown in FIGS. 1 and 2 are each equipped with a connection means through which data can be exchanged by changing the maximum data width (the number of data input/output terminals). Also, the connection means in each transfer engine 30 outputs the same data from the plurality of logically divided input/output terminals. Each search engine 40 can be connected to a plurality of transfer engines 30 by providing such a connection means in both of each transfer engine 30 and each search engine 40. In addition, each transfer engine 30 is connectable to a plurality of search engines 40 and can transmit the same data to each search engine 40. In this way, the same transfer engine 30 and search engine 40 can be used in the routing processors of all types.

The configuration of each connection means is described in detail below using FIGS. 5 and 6.

Figure 5:
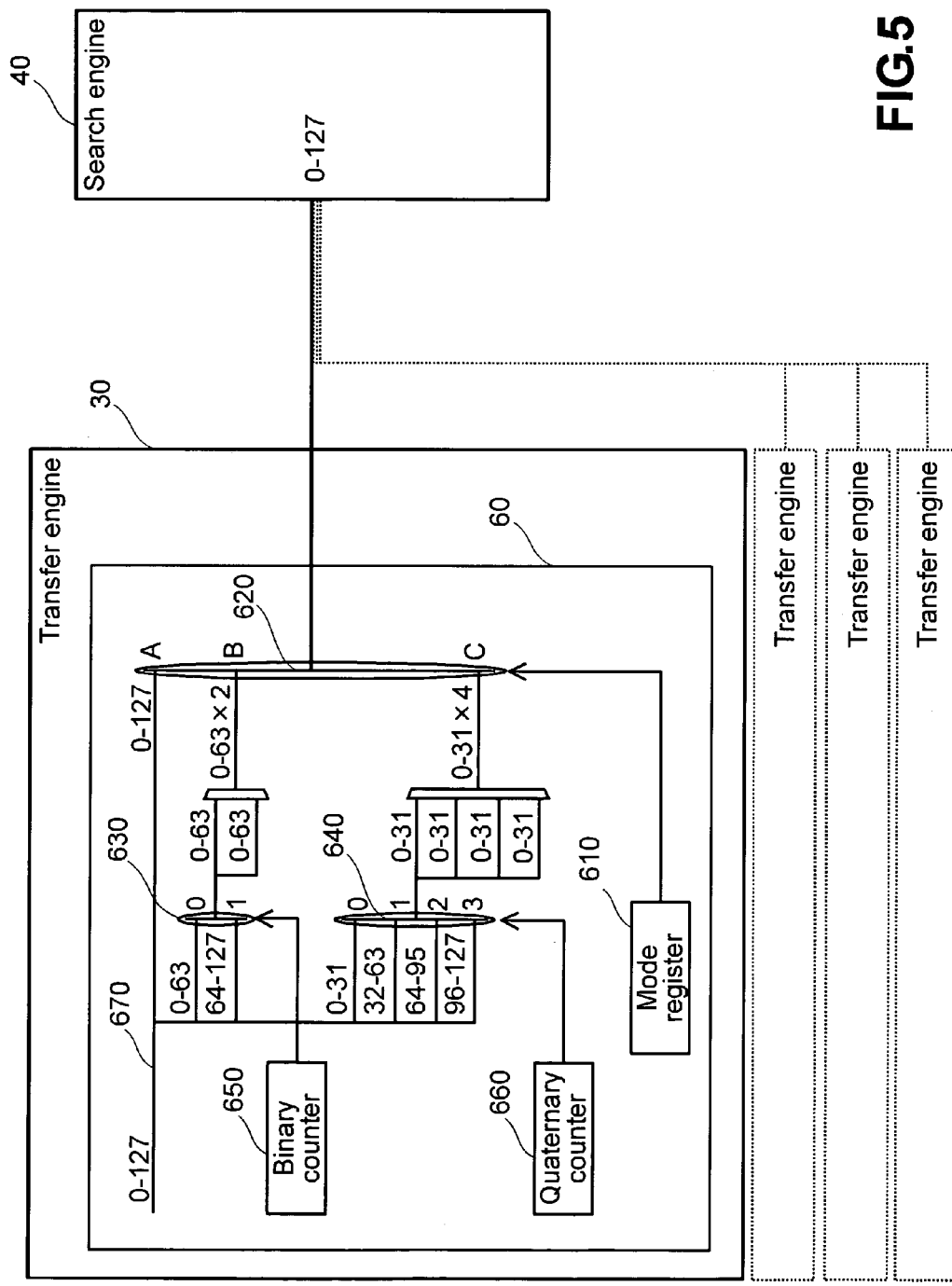
FIG. 5 shows a configuration diagram of a connection means of a transfer engine.

FIG. 5 shows a connection diagram of a connection means 60 of the transfer engine 30.

The connection means 60 is connected to the above-mentioned data input/output terminals 0-127. The connection means 60 receives packet data and the like from internal circuitry of the transfer engine, then sends the data to data input/output terminals, and outputs the data to the data bus. Also, the output route information (or the like) received from the data bus via data input/output terminals is sent to the internal circuitry of the transfer engine.

In FIG. 5, the connection means 60 of the transfer engine 30 has a mode register 610, selectors 620, 630, and 640, a binary counter 650, and a quaternary counter 660. The connection means 60 also has a bus 670 that is 128 bits wide. The bus 670 includes 128 data lines (hereinafter, referred to as data lines 0-127). The bus 670 is connected to internal circuitry or signal lines of the transfer engine, and is connected to data input/output terminals 0-127 via the selector 620. The data lines 0-127 are connected to the respective data input/output terminals 0-127. Each data line transmits only data of the bits corresponding thereto, among all 128 bits of data (hereinafter, referred to as data of bits 0-127) transmitted by the bus 670. More specifically, data in a first bit position (bit 0) is transmitted via a first data line (data line 0). Also, respective data from the first bit position (bit 0) to a 128th bit position (bit 127), which is transmitted by the data lines 0-127, is output (or input) via data input/output terminals corresponding to each bit position. In addition, respective data in each bit position is transmitted via the signal conductor associated with the particular bit position. Therefore, the data of bit 0 transmitted via data line 0 is input/output via a first data input/output terminal (data input/output terminal 0) and transmitted via a first signal conductor (signal conductor 0).

The bus 670 and each data bus may have any width other than 128 bits. Depending on the width of the bus, the number of data input/output terminals may also be other than 128.

At the connection means 60, the 1st to 64th data lines 0-63 of the data lines 0-127 included in the bus 670 are connected to the selector 630 as one of two input line groups, and data lines 64-127, as the other input line group. The selector 630 selects data lines 0-63 or data lines 64-127, depending on the value that the binary counter 650 can take (namely, "0" or "1"), and connects the selected data lines to 64 data output lines. Therefore, either data of the 64 bits (bits 0-63) that are output from data lines 0-63, or data of the 64 bits (bits 64-127) that are output from data lines 64-127 is selected and then output from the selector 630. As shown in FIG. 5, the data output lines connected to the selector 630 are divided into two groups, then recombined as 128 data output lines in all, and connected to the selector 620. Data of the 64 bits output from the selector 630 is therefore duplexed via each data output line and then input to the selector 620 as 128 data output lines in all. For example, if the value of the binary counter 650 is "0" and data of the bits 0-63 output from data lines 0-63 is selected by the selector 630, the selected data of the bits 0-63 becomes 128-bit data, including two groups of bits 0-63, via each data output line.

The binary counter repeats count-up (or count-down) with each output of data from the selector 630, and thus the selector 630 selects data lines 0-63 and data lines 64-127 in sequence. Data of the bits 0-127 transmitted from the bus 670 is divided into data of bits 0-63 and data of bits 64-127, and both sets of data are output from the selector 630 in sequence.

The 0th to 32nd data lines of the data lines 0-127 included in the bus 670 are connected to the selector 640 as one of four input line groups, and data lines 32-63, data lines 64-95, and data lines 96-127, as the other three input line groups. The selector 640 selects one of the four data line groups, depending on the value that the quaternary counter can take (namely, "0", "1", "2", or "3"), and connects the selected data lines to 32 data output lines. Therefore, one of the four sets of 32-bit data that are output from the respective data lines is selected and then output from the selector 640. As shown in FIG. 5, each group of 32 bit data output lines connected to the selector 640 is divided into four groups, then recombined as 128 data output lines in all, and connected to the selector 620. Data of the 32 bits output from the selector 640 is therefore quadruplexed via each data output line and then input to the selector 620 as 128 data output lines in all. For example, if the value of the quaternary counter is "0" and data of the bits 0-31 output from data lines 0-31 is selected by the selector 640, the selected data of the bits 0-31 becomes 128-bit data, including four groups each of bits 0-31, via each data output line.

The quaternary counter repeats count-up (or count-down) with each output of data from the selector 640, and thus the selector 640 selects each data line group in sequence. Data of the bits 0-127 transmitted from the bus 670 is divided into data of bits 0-31, data of bits 32-63, data of bits 64-95, and data of bits 96-127, and the four sets of data are output from the selector 640 in sequence.

As described above, data lines 0-127 of the bus 670 are connected to the selector 620 to create an input A as one input. Also, the data output lines of the selector 630 are connected in duplexed form to create an input B. In addition, the data output lines of the selector 640 are connected in quadruplexed form to create an input C. The selector 620 selects input A, B, or C, depending on the particular setting of mode information in the mode register 610, and then the selected input is connected to data input/output terminals.

The mode register 610 stores mode information that indicates the connection type between the transfer engine 30 and the search engine 40. For example, during initial setup of the network routing apparatus or in other appropriate timing, the mode information is set in the mode register 610 by an administrator of the apparatus or by internal software thereof.

In the case where as shown in FIG. 3(*a*), one transfer engine 30 and one search engine 40 are connected, "mode A" is set in the mode register 610. In this case, the selector 620 selects input A, i.e., data lines 0-127 of the bus 670, and connects input A to data input/output terminals 0-127, whereby data of the bits 0-127 transmitted from data lines 0-127 is then output intact from data input/output terminals 0-127. Data of the bits 0-127, after being output from data input/output terminals 0-127, is received by the data input/output terminals 0-127 of the search engine 40 via the signal conductors 0-127 of the data bus.

Next, in the case where as shown in FIG. 3(*b*), two transfer engines 30 are connected to one search engine 40, "mode B" is set in the mode register 610. In this case, the selector 620 selects input B and connects this input to data input/output terminals 0-127. That is to say, the selector 620 selects a 128-bit signal that has been duplexed by data output lines after being output from the selector 630, and outputs the signal to data input/output terminals 0-127. As described above, the selector 630 selects either data of the bits 0-63 output from data lines 0-63 of the bus 670, or data of the bits 64-127 output from data lines 64-127 of the bus 670, and outputs the data. Therefore, 64-bit data that has been selected by the selector 630 is sequentially output from the two data input/output terminal groups (terminals 0-63 and terminals 64-127) that, constitute data input/output terminals 0-127. In this case, however, as shown in FIG. 3(*b*), only data input/output terminals 0-63, for example, are connected to data input/output terminals 0-63 or 64-127 of the search engine 40 via signal conductors 0-63 or 64-127 of the data bus. Accordingly, only data of the bits 0-63 output from data input/output terminals 0-63 or data of bits 64-127 is then sent to the search engine 40. Since the selector 630 sequentially outputs data of bits 0-63 and data of bits 64-127, data input/output terminals 0-63 (or data input/output terminals 64-127) also output data of bits 0-63 and data of bits 64-127 sequentially.

As shown in FIG. 4(*a*), in the case where two search engines 40 is connected to one transfer engine 30, "mode B" is also set in the mode register 610. In this case, however, as shown in 4(*a*), data input/output terminals 0-63, for example, are connected to data input/output terminals 0-63 of one search engine 40 via signal conductors 0-63 of the data bus. And data input/output terminals 64-127 are connected to data input/output terminals 0-63 of the other search engine 40 via signal conductors 64-127 of the data bus. Therefore, the same output data from data input/output terminals 0-63 and data input/output terminals 64-127 (in other words, data of bits 0-63 or data of bits 64-127) is sent to both search engines 40. Since the selector 630 sequentially outputs data of bits 0-63 and data of bits 64-127, data input/output terminals 0-63 and data input/output terminals 64-127 also output data of bits 0-63 and data of bits 64-127 sequentially.

Next, as shown in FIG. 3(*c*), in the case where four transfer engines 30 is connected to one search engine 40, "mode C" is set in the mode register 610. In this case, the selector 620 selects input C and connects this input to data input/output terminals 0-127. That is to say, the selector 620 selects a 128-bit signal that has been quadruplexed by data output lines after being output from the selector 640, and outputs the signal to data input/output terminals 0-127. As described above, the selector 640 selects either data of the bits 0731 output from data lines 0-31 of the bus 670, data of the bits 32-63 output from data lines 32-63, data of the bits 64-95 output from data lines 64-95, or data of the bits 96-127 output from data lines 96-127, and outputs the data. Therefore, 32-bit data that has been selected by the selector 630 is sequentially output from the four data input/output terminal groups (terminals 0-31, terminals 32-63, terminals 64-95, and terminals 96-127) that constitute data input/ output terminals 0-127. In this case, however, as shown in FIG. 3(c), only data input/output terminals 0-31, for example, are connected to either data input/output terminals 0-31, 32-63, 64-95, or 96-127 of the search engine 40 via either signal conductors 0-31, 32-63, 64-95, or 96-127 of the data bus. Accordingly, only data of either the bits 0-31, 32-63, 64-95, or 96-127 output from data input/output terminals 0-31 is then sent to the search engine 40. Since the selector 640 sequentially outputs data of bits 0-31, 32-63, 64-95, or 96-127, data input/output terminals 0-31 also output the respective data sequentially.

As shown in FIG. 4(b), in the case where four search engines 40 is connected to one transfer engine 30, "mode C" is also set in the mode register 610. In this case, however, as shown in 4(b), data input/output terminals 0-31, for example, are connected to data input/output terminals 0-31 of one search engine 40 via signal conductors 0-31 of the data bus. Other data input/output terminals 0-31, 32-63, 64-95, and 96-127 are also connected to data input/output terminals 0-31 of each search engine 40 via signal conductors 32-63, 64-95, and 96-127 of the data bus, respectively. Therefore, the same output data from respective data input/output terminals is sent to each search engine 40. Since the selector 630 sequentially outputs data of bits 0-31, 32-63, 64-95, and 96-127, each data input/output terminal group also outputs the respective data sequentially.

When two or more transfer engines 30 and two or more search engines 40 are connected, "mode B" or "mode C" is set in the mode register 610, depending on the number of search engines 40 connected to each transfer engine 30.

As described above, in accordance with the connection state between transfer engines 30 and search engines 40, the connection means 60 can output data from the data input/output terminals connected to the search engines 40. The connection means 60 can also output data of the appropriate width according to the particular number of terminals within the data input/output terminal group. In addition, the connection means 60 can output the same data to a plurality of search engines 40.

Figure 6:
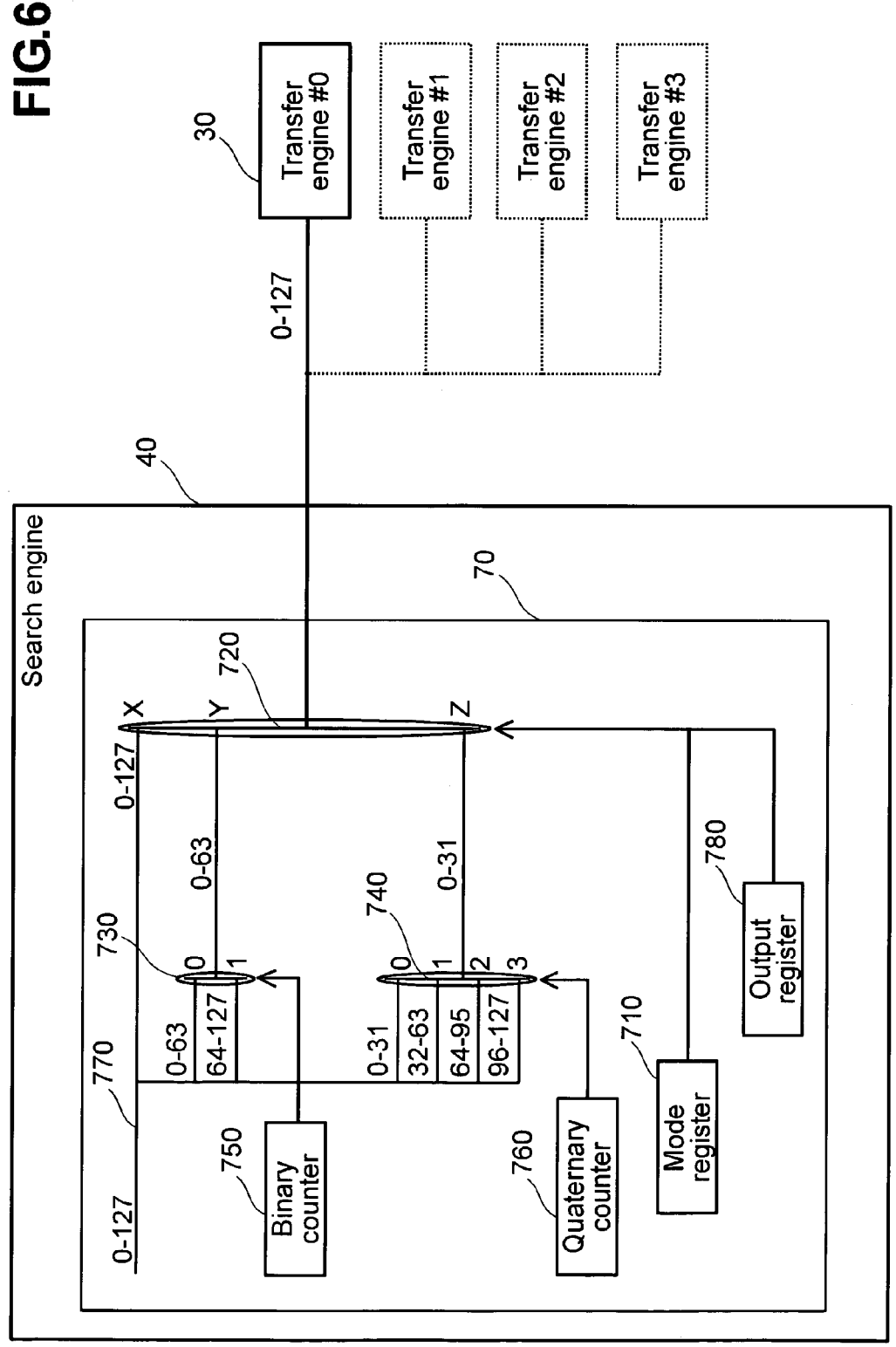
FIG. 6 shows a configuration diagram of a connection means of a search engine.

FIG. 6 shows a configuration diagram of a connection means 70 of the search engine 40.

The connection means 70 is connected to the above-mentioned data input/output terminals 0-127 of the search engine 40, and the connection means 60 receives output route information and other data from internal circuitry of the search engine, then sends the data to data input/output terminals, and outputs the data to the data bus. Also, the packet header information (or the like) received from the data bus via data input/output terminals is sent to the internal circuitry of the search engine.

In FIG. 6, the connection means 70 of the search engine 40 has a mode register 710, selectors 720, 730, 740, a binary counter 750, and a quaternary counter 760. The connection means 70 also has a bus 770 that is 128 bits wide. The bus 770 includes 128 data lines (hereinafter, referred to as data lines 0-127). The bus 770 is connected to internal circuitry or signal lines of the search engine, and is connected to data input/output terminals 0-127 via the selector 720. The data lines 0-127 are each connected to the respective data input/output terminals 0-127.

The mode register 710, selectors 720, 730, 740, binary counter 750, and quaternary counter 770 included in the connection means 70 in FIG. 6 correspond to the mode register 610, selectors 620, 630, 640, binary counter 650, and quaternary counter 660, respectively, included in the connection means 60 in FIG. 5. The connection means 70, therefore, operates similarly to the connection means 60 described above.

However, the search engine 40, unlike transfer engines 30, does not need to output the same data to a plurality of transfer engines 30. More specifically, the search engine 40 outputs, only to the transfer engines 30 to which a packet header has been output, the output route information and other data extracted on the basis of that packet header. For this reason, the connection means 70 further has an output register 80 for storage of information on the data input/output terminals through which is received data such as a packet header. After data receiving, identification information on the data input/output terminals through which the data has been received is set in the output register 80. Identification information on the transfer engine to which the data has been output may be set in the output register 80 instead of the identification information relating to the corresponding data input/output terminals. Identification information on data input/output terminals includes, for example, the numbers pre-assigned to the respective data input/output terminals. Identification information on transfer engines include, for example, the transfer engine numbers sent together with packet headers from the transfer engines. Also, at the connection means 70, the data output lines of the selector 730 are connected to the selector 720 as they are. Depending on whether the value of the binary counter 750 is "0" or "1", the selector 730 selects data of the bits 0-63 output from data lines 0-63 of the bus 770, or data of the bits 64-127 output from data lines 64-127, and then outputs the data. The data output lines of the selector 740 are also connected to the selector 720 as they are. Depending on whether the value of the quaternary counter 760 is "0", "1", "2", or "3", the selector 740 selects data of the bits 0-31 output from data lines 0-31 of the bus 770, data of the bits 32-63 output from data lines 32-63, data of the bits 64-95 output from data lines 64-95, or data of the bits 96-127 output from data lines 96-127, and then outputs the data.

As described above, data lines 0-127 of the bus 770 are connected to the selector 720 to create an input X. Also, the data output lines of the selector 730 are connected to create an input Y. In addition, the data output lines of the selector 740 are connected to create an input Z. The selector 720 selects either input X, Y, or Y, in accordance with the setting of mode information in the mode register 710 and with the setting of identification information in the output register 780, and connects the selected input to data input/output terminals 0-127 or to part thereof. For example, during initial setup of the network routing apparatus or in other appropriate timing, the mode information is set in the mode register 710 by the apparatus administrator or by internal software of the apparatus.

For example, in the case where as shown in FIG. 3(a), one transfer engine 30 and one search engine 40 are connected, "mode X" is set in the mode register 710. In this case, the selector 720 selects input X, i.e., data lines 0-127 of the bus 770, and connects input X to data input/output terminals 0-127, whereby data of the bits 0-127 transmitted from data lines 0-127 is then output intact from data input/output terminals 0-127. Data of the bits 0-127, after being output from data input/output terminals 0-127, is received by the data input/output terminals 0-127 of the transfer engine 30 via the signal conductors 0-127 of the data bus.

Next, in the case where as shown in FIG. 3(b), two transfer engines 30 are connected to one search engine 40, "mode Y" is set in the mode register 710. Suppose that #0 and #1 are assigned to the two transfer engines 30 as their identification numbers. In this case, the selector 720 selects input Y in accordance with mode Y. In addition, in accordance with a transfer engine number set in the output register, the selector 720 connects the data output lines of the selector 730 to either the data input/output terminals 0-63 or data input/output terminals 64-127 of data input/output terminals 0-127. That is to say, the selector 720 selects a 64-bit signal that is output from the selector 730, and outputs the signal to data input/output terminals 0-63 or data input/output terminals 64-127. This allows the connection means 70 to output data only from the data input/output terminals connected to the transfer engine identified by the identification information such as the transfer engine number.

As shown in FIG. 4(*a*), in the case where two search engines 40 is connected to one transfer engine 30, "mode Y" is also set in the mode register 710. In this case, however, only the data input/output terminals 0-63 of each search engine are connected to the data input/output terminals 0-63 or 64-127 of the transfer engine 30 via the data bus. Therefore, the identification information, such as transfer engine number, that is set in the output register 780 is the same and the selector 720 connects the data output lines of the selector 730 only to data input/output terminals 0-63.

Next, as shown in FIG. 3(*c*), in the case where four transfer engines 30 is connected to one search engine 40, "mode Z" is set in the mode register 710. Suppose that #0, #1, #2, and #3 are assigned to the four transfer engines 30 as their identification numbers. In this case, the selector 720 selects input Z in accordance with mode Z. In addition, in accordance with a transfer engine number set in the output register, the selector 720 connects the data output lines of the selector 740 to either the data input/output terminals 0-31, 32-63, 64-95, or 96-127 of data input/output terminals 0-127. That is to say, the selector 720 selects a 32-bit signal that is output from the selector 740, and outputs the signal to the above-selected terminal group of data input/output terminals 0-31, 32-63, 64-95, or 96-127. This allows the connection means 70 to output data only from the data input/output terminals connected to the transfer engine identified by the identification information.

As shown in FIG. 4(*b*), in the case where four search engines 40 is connected to one transfer engine 30, "mode Z" is also set in the mode register 710. In this case, however, only the data input/output terminals 0-31 of each search engine 40 are connected to either the data input/output terminals 0-31, 32-63, 64-95, or 96-127 of the transfer engine 30 via the data bus. Therefore, identification information that is set in the output register 780 is the same and the selector 720 connects the data output lines of the selector 730 only to data input/output terminals 0-31.

When two or more transfer engines 30 and two or more search engines 40 are connected, "mode Y" or "mode Z" is set in the mode register, depending on the number of transfer engines 30 connected to each search engine 40.

As described above, in accordance with the connection state between transfer engines 30 and search engines 40, the connection means 70 can output data from the data input/output terminals connected to the transfer engines 30. The connection means 70 can also output data of the appropriate width according to the particular number of terminals in the data input/output terminal group.

FIG. 7 shows the format of the routing table used by the search engine 40.

One or more IP addresses and output route information associated with each IP address are stored in the routing table for example; the output route information containing, for example, output switching engine numbers, output transfer engine numbers, and output line numbers.

Here, the transfer engines 30, search engines 40, and switching engines 50 within each routing processor are each assigned a specific identification number uniquely defined in the routing processor. The respective ports of the transfer engines 30 connected to lines are also each assigned a specific identification number uniquely defined in the network routing apparatus, in the routing processor, or for each transfer engine. Therefore, the output switching engine numbers, output transfer engine numbers, and output line numbers stored in the routing table denote the identification numbers assigned to the switching engines, transfer engines, and lines to which packets are to be transmitted. Any information other than these identification numbers may be used to identify respective engines and lines.

As described above, in each routing processor, a plurality of transfer engines 30 can be connected to one switching engine 50. This is why output transfer engine numbers are included in output route information so that the switching engine 50 can identify the transfer engine to which it is to transfer a packet. Also, non-IP addresses, for example, MAC addresses or the like may be stored in the routing table.

FIG. 8 shows the format of a packet having output route information assigned thereto. In FIG. 8, the packet comprises a received packet including a packet header and a payload (data), and output route information extracted from the search engine 40.

For example, the switching engine 50 receives a received packet and output route information from the transfer engine 30, creates a packet of the format shown in FIG. 8, and outputs the packet to the switch 10. Alternatively, the transfer engine 30 may use the output route information received from the search engine 40 and the received packet read out from the packet buffer, then create a packet of the format shown in FIG. 8, and output the packet to the switching engine 50.

Figure 9:
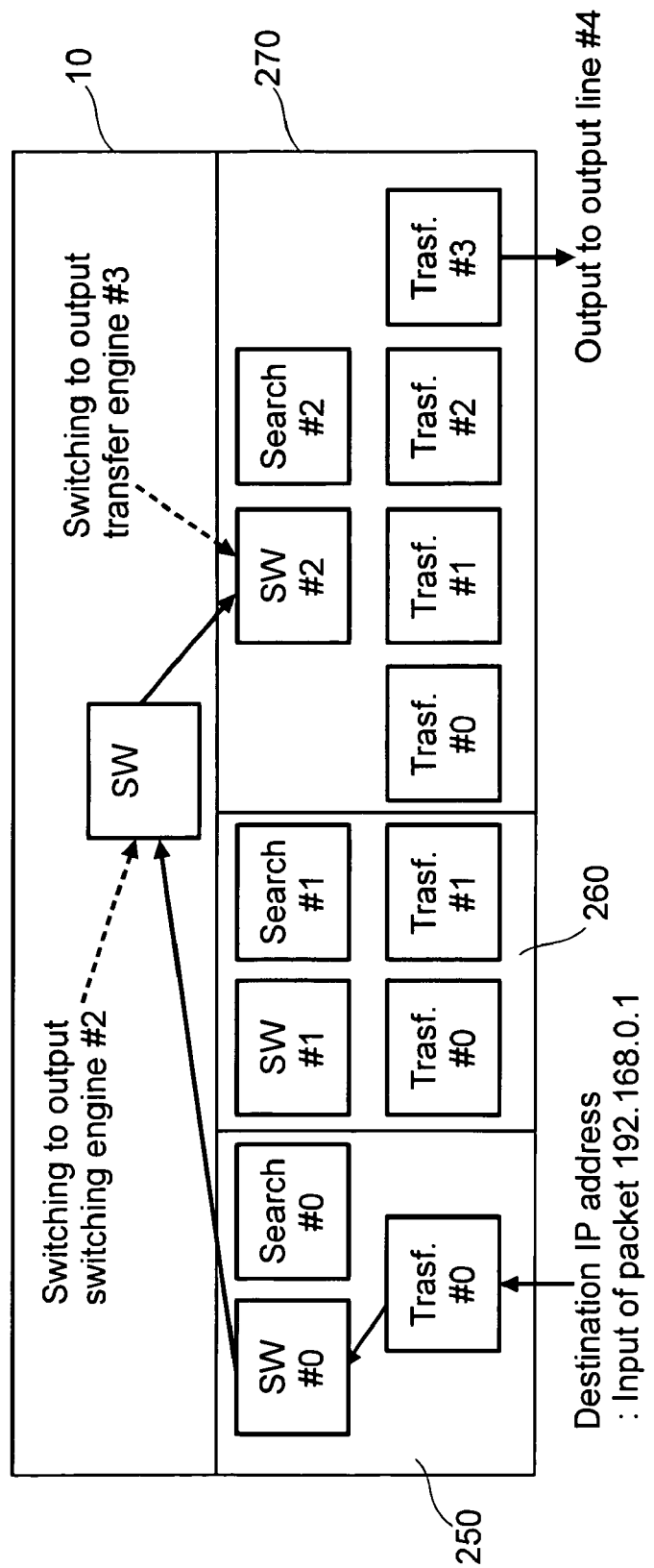
FIG. 9 shows an example of packet transfer within the network routing apparatus.

FIG. 9 shows an example of packet transfer within the network routing apparatus. In FIG. 9, the network routing apparatus is equipped with a plurality of routing processors, 250, 260, and 270, each having a single-to-single or single-to-multiple configuration of search engines 40 and transfer engines 30 in terms of quantity. Identification numbers are preassigned to the switching engines 50, search engines 40, and transfer engines 30 included within each routing processor. In the example of FIG. 9, serial numbers beginning with #0 are assigned to each search engine 40 and each switching engine 50. Also, each transfer engine 30 is assigned a serial number beginning with #0 for each routing processor. Each transfer engine 30 may be assigned a serial number for each group of transfer engines connected to one search engine 40. Ports of each transfer engine 30 connected to respective lines are also each assigned a specific identification number. Although the connection status of each engine is not shown in FIG. 9, each transfer engine 30 is connected to the search engines 40 and the switching switches 50, and the switch 10, to each switching engine 50 of each routing processor, as in FIG. 1.

Figure 10:
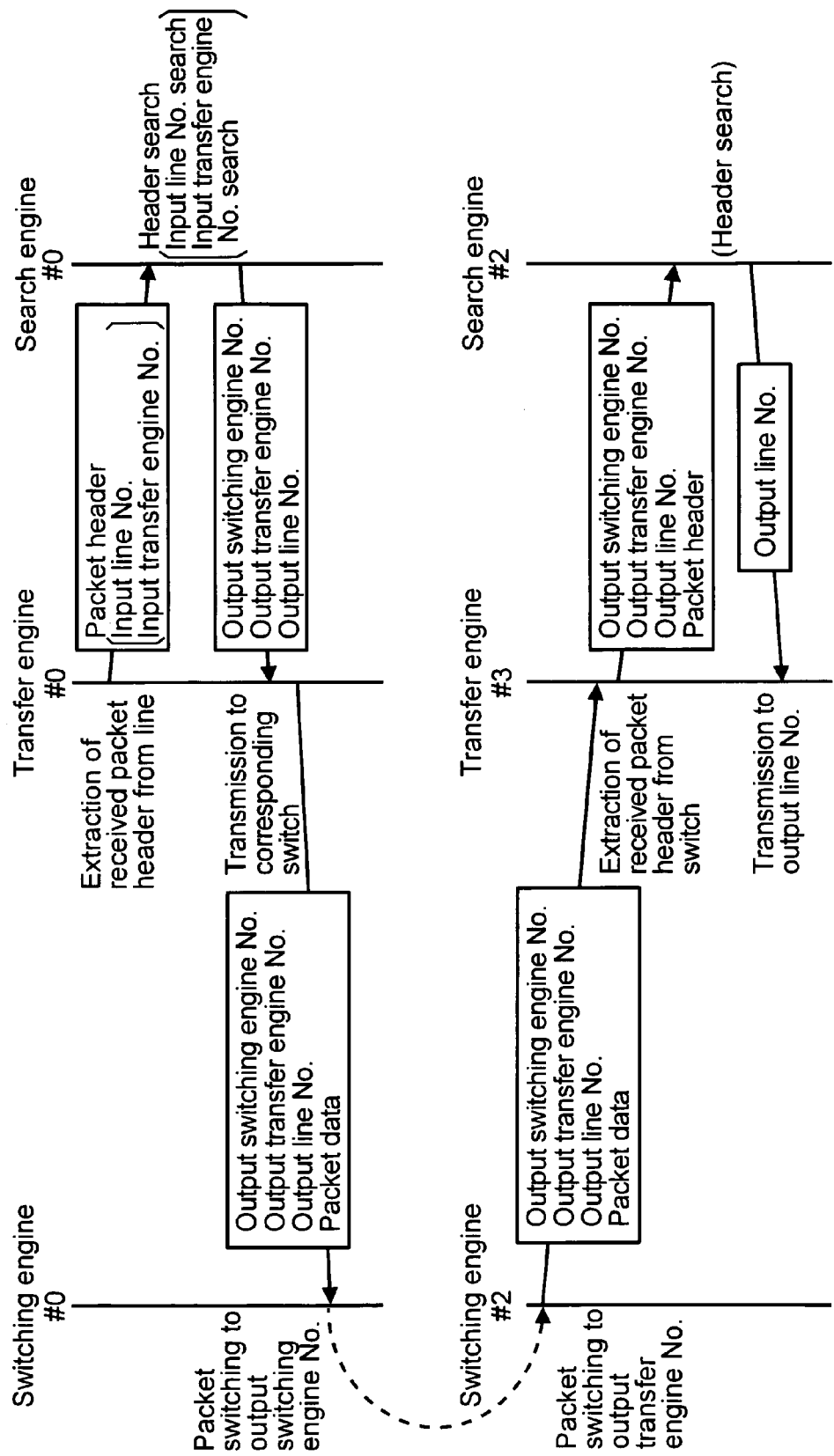
FIG. 10 shows a sequence diagram of the network routing apparatus.
Figure 12:
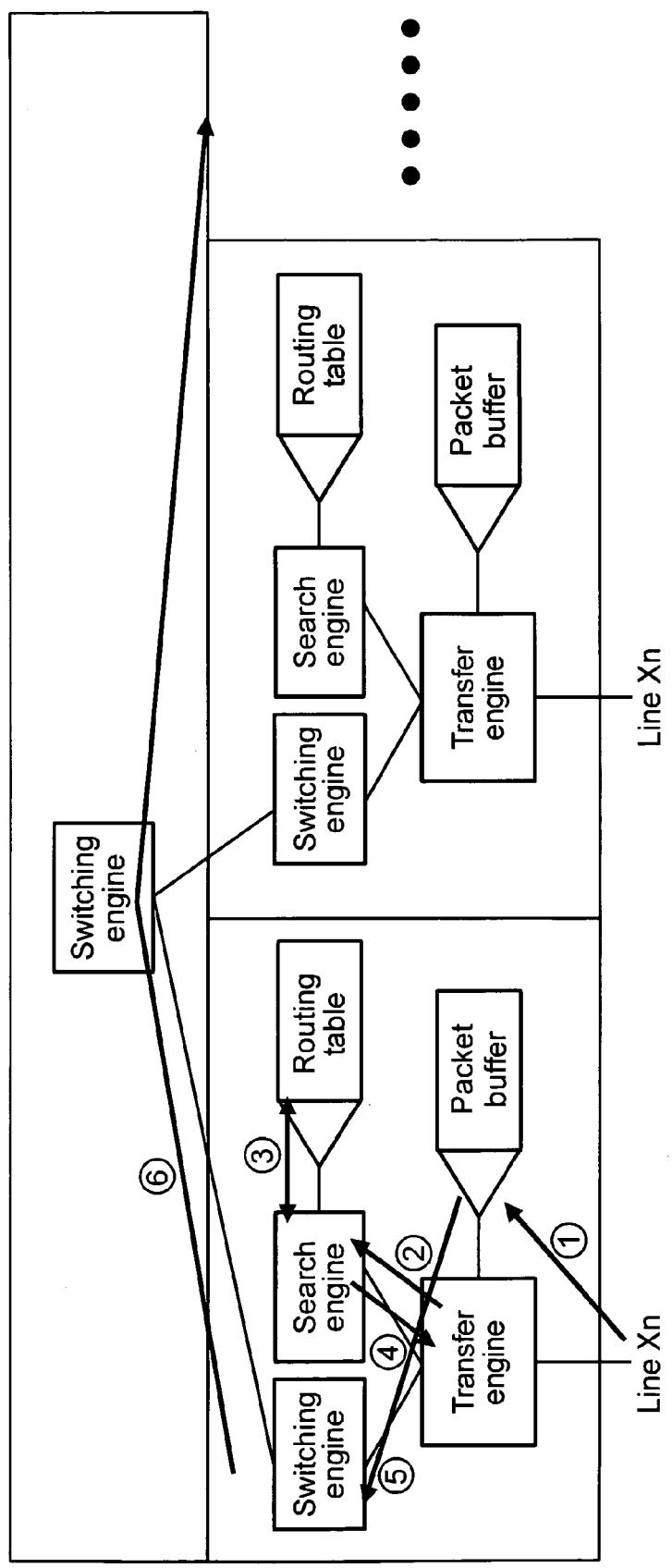
FIG. 12 shows yet another configuration example of the network routing apparatus.

FIG. 10 shows a sequence diagram of the network routing apparatus. This sequence diagram shows a sequence in which a packet is received by a transfer engine #0 within the routing processor 250 of FIG. 9 and then transmitted from a search engine #3 of the routing processor 270. Operation is outlined below using FIGS. 9 and 10. This outline assumes that the output route information shown in FIG. 7 is stored within a routing table used by the search engine #0.

First, the transfer engine #0 of the routing processor 250 receives a packet from a line. This received packet has a packet header including "192.168.0.1" as its destination IP address. The transfer engine #0 extracts the packet header from the received packet and transmits the packet header to the search engine #0. The transfer engine #0 may transmit, to the search engine #0, the input line number and input transfer engine number where the packet was received. The transfer engine #0 also stores the received packet into a packet buffer.

After receiving the packet header, the search engine #0 searches the routing table, with the destination IP address "192.168.0.1" of the packet header as a search key. Since the same IP address as the destination IP address is already registered in the routing table shown in FIG. 7, the search engine #0 extracts output route information associated with the above IP address, such as output switching engine number "2", output transfer engine number "3", and output line number "4". The search engine #0 transmits the acquired output route information to the transfer engine #0. The search engine #0 may also receive an input line number and an input transfer engine number from the transfer engine #0 and performs filtering or QoS-related processing based on the received information.

The transfer engine #0, after receiving output route information from the search engine #0, assigns the output route information to the received packet stored within the packet buffer, creates a packet of the format shown in FIG. 8, and transmits the packet to a switching engine #0. The switching engine #0, after receiving the packet, refers to the output route information and then transfers the packet to the switch 10 in accordance with the output switching engine number "2" included in the output route information.

Similarly, after receiving the packet, a switching engine within the switch 10 refers to the output route information and then transfers the packet to a switching engine #2 of the routing processor 270 in accordance with the output switching engine number "2" included in the output route information.

After receiving the packet, the switching engine #2 refers to the output route information and then transfers the packet to a transfer engine #3 in accordance with an output transfer engine number "3" included in the output route information.

After receiving the packet, the transfer engine #3 stores the packet into a packet buffer. Also, the transfer engine #3 extracts output route information and packet header from the packet and transmits both to the search engine #2.

The search engine #2 then performs, for example, filtering, delay/priority control, or QoS-related processing, by use of the received output route information and packet header. Such filtering, delay/priority control, or QoS-related processing by the search engine #2 may be omitted. The search engine #2 also transmits, for example, an output line number "4" included in the received output route information, to the transfer engine #3. The search engine #2 may transmit appropriate data other than an output line number, to the transfer engine #3.

The transfer engine #3 removes output route information from the packet and then outputs the packet, from a port corresponding to the output line number "4" received from the search engine #2 or switching engine #2, to the corresponding line.

An example in which a packet is received by the transfer engine #0 of the routing processor 250 has been described above. However, when other transfer engines receive a packet, the packet is also routed in a sequence similar to the above. In the network routing apparatus configuration shown in FIG. 1 with a routing processor 230 of type C, among the plurality of search engines 40 and switching engines 50 in the routing processor, only the search engines 40 and switching engine 50 operating as the acting system, are set up beforehand. And the search engines 40 and switching engine 50 set up as the acting system, operate similarly to the foregoing to thereby route a packet.

By the way, SBTL (Simultaneous Bi-directional Transfer Logic) interfaces can be used to perform connections between one transfer engine 30 and one search engine 40 and between one transfer engine 30 and one switching engine 50. SBTL is a technique that physically enables bi-directional communications using one signal line.

FIG. 11 shows a conceptual diagram of SBTL. In FIG. 11, one transfer engine 30 and one search engine 40 are connected using SBTL.

When a signal with a value of "0" or "1" is transmitted from both engines to a signal line, a signal flowing through the signal line takes either a High, Middle, or Low level, depending on the values of the signals from both engines, as shown in FIG. 11. For example, if the values of the signals from both engines are "1", the signal in the signal line takes a High level. If the value of one signal only is "1", the signal in the signal line takes a Middle level. If the values of both signals are "0", the signal in the signal line takes a Low level. When the transfer engine or the search engine receives a signal using SBTL, both engines judge, from both the value of the signal which the engine itself has transmitted, and the level of the signal received from the signal line, the values of the signals transmitted from each other. For example, when the transfer engine outputs a signal of "1", if the signal received by the transfer engine is of a High level, the signal transmitted from the search engine is judged to be "1". When the transfer engine outputs a signal of "1", if the signal received by the transfer engine is of a Middle level, the signal transmitted from the search engine 40 is judged to be "0". The same also applies when the transfer engine outputs a signal of "0". The transfer engine and the search engine use preset threshold levels to judge the value of each other's signal. Before receiving a signal, both engines change the threshold level of the other according to particular values of their own output signals. For example, when the transfer engine outputs a signal of "1", by setting a threshold level to a level somewhere in between Middle and High, it is possible for the signal of a Middle level to be received as the signal with a value of "0", or for the signal of a High level, as the signal with a value of "1".

Since packet headers and output route information are exchanged between the transfer engine 30 and the search engine 40, frequent (packet-by-packet) bi-directional communication occurs between both engines. Packet headers and output route information can be transmitted and received more efficiently by connecting the transfer engine 30 and the search engine 40 by use of SBTL. Also, when transfer engines 30 and search engines 40 are connected into a single-to-multiple, multiple-to-single, or multiple-to-multiple configuration in terms of quantitative rate, although the width of exchangeable data decreases, this influence can be reduced by, as described above, exchanging signals in a bi-directional manner using SBTL.

As heretofore described, transfer engines 30 and search engines 40, both having the same configuration, can be connected into a single-to-single, multiple-to-single, single-to-multiple, or multiple-to-multiple configuration in terms of quantitative rate. Although the description heretofore given relates to 1:1, 1:2, 2:1, 1:4, or 4:1 combinations between transfer engines 30 and search engines 40, both engines may be connected in other combinations. Also, the switching engine 50 can have the same connection means as that of the search engine 40.

What is claimed is:

1. A network routing apparatus, comprising:

a plurality of routing units each connected to at least one line, wherein each of said plurality of routing units receives a packet from a line, extracts output destination information using a packet header included in the packet received, and routes the received packet in accordance with the output destination information; and a switching unit connected to each of said plurality of routing units, wherein said switching unit receives from each of said routing units a packet and the output destination information, and in accordance with the output destination information, transfers the packet received, to any one of said plurality of routing units;

each of said routing units further comprising:

one or a plurality of transfer means comprising a plurality of input and output terminals, each connected to at least one line, wherein said plurality of transfer means each extracts and outputs a packet header of the packet received from each line;

one or a plurality of search means comprising a plurality of input and output terminals, each connected to each of said plurality of transfer means via said plurality of input and output terminals, wherein said plurality of search means each receive the packet header from each of said plurality of transfer means, extract the output destination information by use of the packet header, and output the output destination information; and one or a plurality of switch input and output means each for receiving the received packet and the output destination information and transmitting the received packet to said switching unit or each of said plurality of transfer means in accordance with the output destination information;

wherein, in each said routing unit, one or said plurality of search means are each connected to one or said plurality of transfer means; and wherein a connection configuration determines the number of input and output terminals between the transfer means and the search means; and wherein a data size transferred between the search means and the transfer means is configurable based on the connection configuration.

2. The network routing apparatus according to claim 1, comprising as said routing unit:

a first routing unit in which one of said search means is connected to one of said transfer means, a second routing unit in which said plurality of transfer means are connected to one of said search means, a third routing unit in which said plurality of search means are connected to one of said transfer means, or a fourth routing unit in which said plurality of transfer means and said plurality of search means are connected to one another.

3. The network routing apparatus according to claim 1, comprising as said routing units:

a first routing unit in which said plurality of search means are connected to one of said transfer means, or a second routing unit in which said plurality of transfer means and said plurality of search means are connected to one another, wherein, in said first or second routing unit, said plurality of transfer means each output the packet header to said plurality of connected search means.

4. The network routing apparatus according to claim 1, comprising as said routing unit:

a first routing unit in which said plurality of transfer means are connected to one of said search means, or a second routing unit in which said plurality of transfer means and said plurality of search means are connected to one another, wherein, in said first or second routing unit, said plurality of transfer means each output the output destination information to one of said transfer means to which the packet header was output.

5. The network routing apparatus according to claim 1, wherein said transfer means further comprises:

a retaining means that retains connection information for identifying the number of said search means connected to said transfer means; and an output means that outputs the packet header to each of said search means, in bit increments associated with the connection information.

6. The network routing apparatus according to claim 1, wherein said search means further comprises:

a retaining means that retains connection information for identifying the number of said transfer means connected to said search means; and an output means that outputs the output destination information, in bit increments associated with the connection information, to said transfer means.

7. The network routing apparatus according to claim 6, wherein said search means further comprises a second retaining means that retains identification information for identifying said transfer means;

wherein said output means outputs the output destination information to said transfer means identified by the identification information.

8. A network routing apparatus, comprising:

a plurality of routing units each connected to at least one line, wherein each of said plurality of routing units receives a packet from a line, extracts output destination information using a packet header included in the packet received, and routes the received packet in accordance with the output destination information; and a switching unit connected to each of said plurality of routing units, wherein said switching unit receives from each of said routing units a packet and the output destination information, and in accordance with the output destination information, transfers the packet received, to any one of said plurality of routing units;

each of said routing units further comprising:

one or a plurality of transfer means comprising a plurality of input and output terminals, each connected to at least one line, wherein said plurality of transfer means each extract and output a packet header of the packet received from each line;

one or a plurality of search means comprising a plurality of input and output terminals, each connected to each of said plurality of transfer means via said plurality of input and output terminals, wherein said plurality of search means each receive the packet header from each of said plurality of transfer means, extract the output destination information by use of the packet header, and output the output destination information; and one or a plurality of switch input and output means each for receiving the received packet and the output destination information and transmitting the received packet to said switching unit or each of said plurality of transfer means in accordance with the output destination information;

wherein, in each said routing unit, one or said plurality of search means are each connected to one or said plurality of transfer means, wherein a connection configuration determines the number of input and output terminals between the transfer means and the search means, wherein a data size transferred between the search means and the transfer means is configurable based on the connection configuration, said routing apparatus comprising one of:
  a first routing unit in which one of said search means is connected to one of said transfer means,
  a second routing unit in which said plurality of transfer means are connected to one of said search means,
  a third routing unit in which said plurality of search means are connected to one of said transfer means, or
  a fourth routing unit in which said plurality of transfer means and said plurality of search means are connected to one another;

wherein said transfer means and said search means both comprise an "n" number of input and output terminals "n": natural number equal to or greater than 2;

in said first routing unit, said transfer means and said search means are connected using said "n" number of input and output terminals;

in said second or fourth routing unit, when an "i" number of said search means are connected to said transfer means "i": natural number equal to or greater than 2, said transfer means and said "i" number of search means are each connected using respectively an "n/i" number of input and output terminals; and in said third or fourth routing unit, when a "j" number of said transfer means are connected to said search means "j": natural number equal to or greater than 2, said search means and said "j" number of transfer means are each connected using an "n/j" number of input and output terminals.

9. A network routing apparatus, comprising:

a plurality of routing units each connected to at least one line, wherein each of said plurality of routing units receives a packet from a line, extracts output destination information using a packet header included in the packet received, and routes the received packet in accordance with the output destination information; and a switching unit connected to each of said plurality of routing units, wherein said switching unit receives from each of said routing units a packet and the output destination information, and in accordance with the output destination information, transfers the packet received, to any one of said plurality of routing units;

each of said routing units further comprising:
  one or a plurality of transfer means comprising a plurality of input and output terminals, each connected to at least one line, wherein said plurality of transfer means each extract and output a packet header of the packet received from each line;
  one or a plurality of search means comprising a plurality of input and output terminals, each connected to each of said plurality of transfer means via said plurality of input and output terminals, wherein said plurality of search means each receive the packet header from each of said plurality of transfer means, extract the output destination information by use of the packet header, and output the output destination information; and
  one or a plurality of switch input and output means each for receiving the received packet and the output destination information and transmitting the received packet to said switching unit or each of said plurality of transfer means in accordance with the output destination information;

wherein, in each said routing unit, one or said plurality of search means are each connected to one or said plurality of transfer means, wherein a connection configuration determines the number of input and output terminals between the transfer means and the search means, wherein a data size transferred between the search means and the transfer means is configurable based on the connection configuration, said routing apparatus comprising one of:
  a first routing unit in which one of said search means is connected to one of said transfer means,
  a second routing unit in which said plurality of transfer means are connected to one of said search means,
  a third routing unit in which said plurality of search means are connected to one of said transfer means, or
  a fourth routing unit in which said plurality of transfer means and said plurality of search means are connected to one another, in said first routing unit, said transfer means and said search means both transmit and receive the packet header or the output destination information, in increments of a maximum of "n" bits "n": natural number equal to or greater than 2;

in said second or fourth routing unit, when an "i" number of said search means are connected to said transfer means "i": natural number equal to or greater than 2, said transfer means and said "i" number of search means each transmit and receive the packet header or the output destination information, in increments of a maximum of "n/i" bits; and in said third or fourth routing unit, when a "j" number of said transfer means are connected to said search means "j": natural number equal to or greater than 2, said search means and said "j" number of transfer means each transmit and receive the packet header or the output destination information, in increments of a maximum of "n/j" bits.

10. A network routing apparatus, comprising:

a plurality of routing units each connected to at least one line, wherein each of said plurality of routing units routes the packet received from each line;

and a switching means connected to each of said plurality of routing units, wherein said switching means transfers, to any one of said plurality of routing units, the packet received from each of said routing units;

each of said routing units further comprising:

one or a plurality of transfer means comprising a plurality of input and output terminals, each connected to at least one of the lines, wherein said plurality of transfer means each extract and output a packet header of the packet received from each line; and one or a plurality of search means comprising a plurality of input and output terminals, each connected to each of said plurality of transfer means, wherein said plurality of search means each receive the packet header from each of said plurality of transfer means, extract output destination information using the packet header, and output the output destination information;

wherein each of said routing units is either
- a first routing unit in which one of said search means is connected to one of said transfer means using the said plurality of input and output terminals,
- a second routing unit in which said plurality of transfer means are connected to one of said search means using the said plurality of input and output terminals,
- a third routing unit in which said plurality of search means are connected to one of said transfer means using the said plurality of input and output terminals, or
- a fourth routing unit in which said plurality of transfer means and said plurality of search means are connected to one another using the said plurality of input and output terminals, wherein a connection configuration determines the number of input and output terminals between the transfer means and the search means, wherein a data size transferred between the search means and the transfer means is configurable based on the connection configuration.

11. A routing unit used in a routing apparatus which is connected to a plurality of lines to route the packet received from each line, said routing unit comprising:
- one or a plurality of transfer means comprising a plurality of input and output terminals, each connected to at least one line, wherein said plurality of transfer means each receive a packet from a line, extract a packet header of the packet received, and output the packet header; and
- one or a plurality of search means comprising a plurality of input and output terminals, each connected to each of said transfer means, wherein said plurality of search means each receive the packet header, extract output destination information using the packet header, and output the output destination information;

wherein one or said plurality of search means are connected to each of said plurality of transfer means using the said plurality of input and output terminals, and one or said plurality of transfer means are connected to each of said plurality of search means using the said plurality of input and output terminals, wherein a connection configuration determines the number of input and output terminals between the transfer means and the search means, wherein a data size transferred between the search means and the transfer means is configurable based on the connection configuration.

12. The routing unit according to claim 11,
wherein said plurality of search means are connected only to one of said plurality of transfer means or said plurality of transfer means are connected to said plurality of search means; and
wherein said plurality of transfer means each output the packet header to said plurality of connected search means.

13. The routing unit according to claim 11,
wherein said plurality of transfer means are connected only to one of said plurality of search means or said plurality of search means are connected to said plurality of transfer means; and wherein said plurality of search means each output the output destination information only to said transfer means that has output the packet header.

14. The routing unit according to claim 11, wherein said transfer means further comprises:
- a retaining means that retains connection information for identifying the number of said search means connected to said transfer means; and
- an output means that outputs the packet header information, in bit increments associated with the connection information, to said search means.

15. The network routing apparatus according to claim 11, wherein said search means farther comprises:
- a retaining means that retains identification information for identifying the number of said transfer means connected to said search means; and
- an output means that outputs the output destination information, in bit increments associated with the connection information, to said transfer means.

16. The routing unit according to claim 15, wherein said transfer means further comprises:
- a second retaining means that retains identification information for identifying said transfer means,
- wherein said output means outputs the output destination information to said transfer means to be identified by the identification information.

17. A routing unit used in a routing apparatus which is connected to a plurality of lines to route the packet received from each line, said routing unit comprising:
- one or a plurality of transfer means comprising a plurality of input and output terminals, each connected to at least one line, wherein said plurality of transfer means each receive a packet from a line, extract a packet header of the packet received, and output the packet header; and
- one or a plurality of search means comprising a plurality of input and output terminals, each connected to each of said transfer means, wherein said plurality of search means each receive the packet header, extract output destination information using the packet header, and output the output destination information, wherein one or said plurality of search means are connected to each of said plurality of transfer means using the said plurality of input and output terminals, and one or said plurality of transfer means are connected to each of said plurality of search means using the said plurality of input and output terminals, wherein a connection configuration determines the number of input and output terminals between the transfer means and the search means, wherein a data size transferred between the search means and the transfer means is configurable based on the connection configuration, said plurality of transfer means and said plurality of search means each comprise an "n" number of input and output terminals "n": natural number equal to or greater than 2;

when one of said transfer means and one of said search means are connected to each other, both means are connected using said "n" number of input and output terminals;

when an "i" number of said search means are connected to one of said transfer means "i": natural number equal to or greater than 2, said transfer means and said "i" number of search means each is connected using an "n/i" number of input and output terminals; and when a "j" number of said transfer means are connected to one of said search means "j": natural number equal to or greater than 2, said search means and said "j" number of transfer means each being connected using respectively an "n/j" number of input and output terminals.

18. A routing unit used in a routing apparatus which is connected to a plurality of lines to route the packet received from each line, said routing unit comprising:

one or a plurality of transfer means comprising a plurality of input and output terminals, each connected to at least one line, wherein said plurality of transfer means each receive a packet from a line, extract a packet header of the packet received, and output the packet header; and one or a plurality of search means comprising a plurality of input and output terminals, each connected to each of said transfer means, wherein said plurality of search means each receive the packet header, extract output destination information using the packet header, and output the output destination information, wherein one or said plurality of search means are connected to each of said plurality of transfer means using the said plurality of input and output terminals, and one or said plurality of transfer means are connected to each of said plurality of search means using the said plurality of input and output terminals, wherein a connection configuration determines the number of input and output terminals between the transfer means and the search means, wherein a data size transferred between the search means and the transfer means is configurable based on the connection configuration, when one of said transfer means and one of said search means are connected to each other, said transfer means and said search means both transmit and receive the packet header or the output destination information, in increments of a maximum of "n" bits "n": natural number equal to or greater than 2;

when an "i" number of said search means are connected to one of said transfer means "i": natural number equal to or greater than 2, said transfer means and said "i" number of search means each transmit and receive the packet header or the output destination information, in increments of a maximum of "n/i" bits; and when a "j" number of said transfer means are connected to one of said search means "j": natural number equal to or greater than 2, said search means and said "j" number of transfer means each transmit and receive the packet header or the output destination information, in increments of a maximum of "n/j" bits.

* * * * *